July 15, 1969     I. L. WILCOX     3,455,500

CONTAINER AND COVER

Filed Jan. 3, 1967

INVENTOR.
I. L. WILCOX

BY *Young & Quigg*

ATTORNEYS

United States Patent Office 3,455,500
Patented July 15, 1969

3,455,500
CONTAINER AND COVER
Isaac L. Wilcox, Fulton, N.Y., assignor to Phillips
Petroleum Company, a corporation of Delaware
Filed Jan. 3, 1967, Ser. No. 606,804
Int. Cl. B65d *5/64*
U.S. Cl. 229—43                                       5 Claims

ABSTRACT OF THE DISCLOSURE

A container with outwardly flared top portion having a cover with inner and outer depending flanges, an inwardly extending bead on the outer flange and an outwardly extending bead on the inner flange. The outwardly extending bead contacts the inside surface of the container and scrapes materials away from the upper portion of the inside surface when the cover is fitted on the container.

This invention relates to a container cover. In one of its aspects, it relates to a container having a snapfit cover wherein the cover has a means for wiping any food material from the upper portion of the sides as the cover is applied to the container.

In the carry out trade, such as delicatessens and the like, when loosely fitting covers are applied to containers, the contents have a tendency to spill over the sides. The spilling can sometimes be attributed to liquid products seeping over the top edge of the container and down the sides thereof. I have now discovered that an improved cover can be constructed for a container by providing on the cover, in addition to an outer clamping bead, an inner flange having an outwardly extending bead thereon to wipe the material from the upper walls of the container as the cover is applied and also to prevent the material within the container from seeping out of the container over the upper wall portions thereof.

By various aspects of this invention, one or more of the following or other objects can be obtained.

It is an object of this invention to provide a container and cover therefor for carry out trade applications.

It is a further object of this invention to provide a cover for a container wherein liquid material is prevented from spilling out over the sides of the container.

It is a further object of this invention to provide a cover for a metal foil lined or plastic lined fiberboard container which cover prevents liquid material within the container from wetting the top of the fiberboard container.

Other aspects, objects, and the several advantages of this invention are apparent to one skilled in the art upon studying the disclosure, the drawings, and the appended claims. According to the invention, a cover is provided for a container which has an outwardly flared rim at the top portion thereof and is preferably constructed of paperboard lined with aluminum foil or polyethylene, the cover comprising a closure portion adapted to fit over the open end of the container, the closure having an outer depending lip with an inwardly extending clamping bead adapted to be positioned under the outwardly flanged rim of the container, and an inner depending flange stationed a distance from said outwardly flared rim and having an outwardly extending projection which abuts the inner portion of the upper wall portion of the container.

Figure 1:
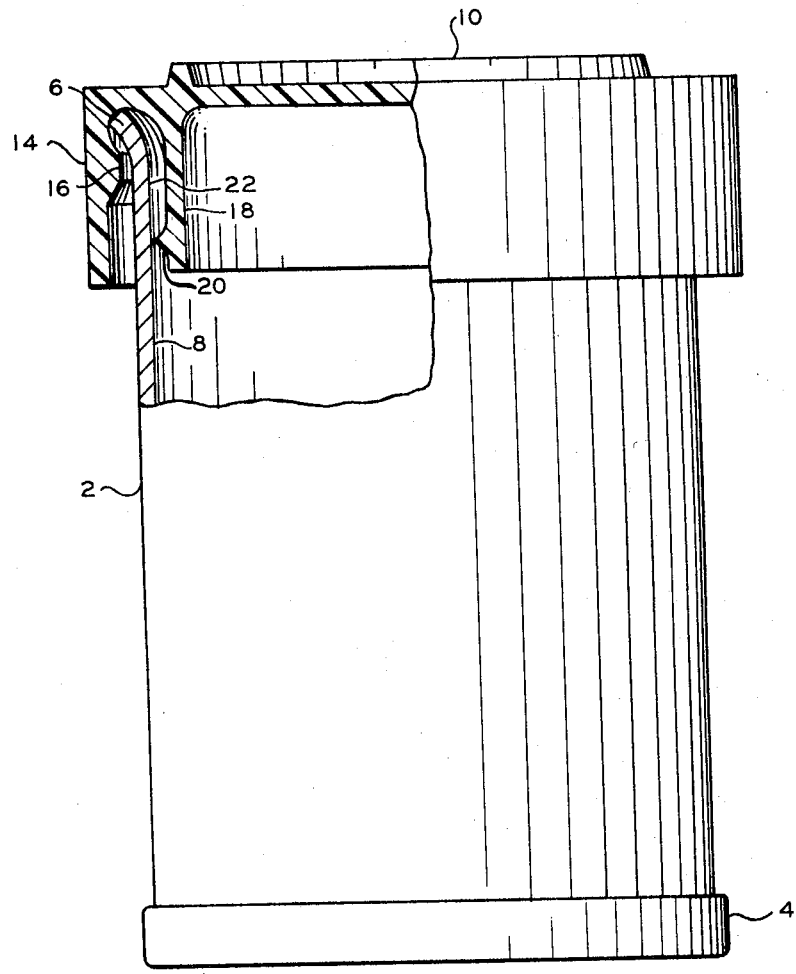
Figure 2:
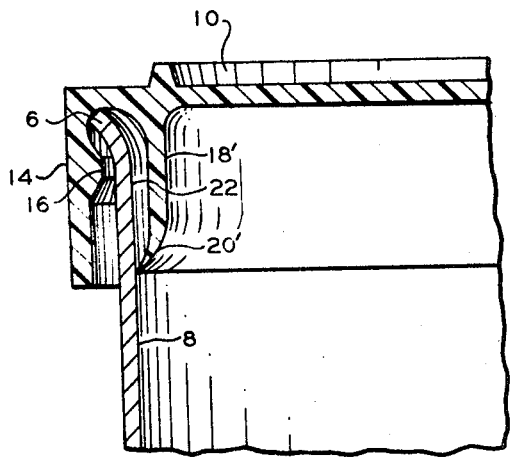

The invention will now be described with reference to the accompanying drawings in which FIGURE 1 shows an embodiment of the invention and FIGURE 2 shows a modification of the embodiment shown in FIGURE 1.

Referring now to the drawing and to FIGURE 1 in particular, a container 2, having a bottom wall rolled and crimped onto side walls 8, forming bead 4, has a cover 10 positioned on the top portion thereof. The upwardly extending sidewalls 8 terminate in an outwardly flared rim 6, cover 10 has an outer downwardly extending flange 14 with inwardly extending bead 16 adapted to clamp under the outwardly extending rim 6 of the container wall 8. The cover also has an inner depending flange 18 which is spaced a distance from side wall 8 when the cover is in position on the container. The inner flange 18 has an outward projection 20 near the bottom thereof and the narrow flange end of the projection 20 abuts against side wall 8 when the cover is in position on the container. During the application of the cover 10 to the container 2, the narrow outermost portion of the outward projection 20 will rub against the upper portion 22 of side wall 8 and scrapes therefrom any material including liquid which adheres thereto. Preferably, projection 20 is pointed outwardly so that the projection will obtain a squeegee effect on surface 22 as the cover is applied. The projection 20 also maintains the material within the container, particularly liquid, and prevents the same from seeping up the side walls to area 22. In prior art containers where the projection 20 is not provided, the liquid material within the container can seep up the side walls and wet the top of the outwardly flanged rim 6. This wetting of flange 6 will soften the same and thus the top will be easily removed from the container as well as cause the liquid material to spill down the sides of the container.

The container 2 can be any shape in cross section such as round, square, rectangular and the like. However, a round container is preferred. Similaly, the cover 10 will conform to the shape of the container 2. In the preferred embodiment, the container is round, bead 16 is annularly shaped and clamps under outwardly extending rim 6 throughout the whole circumference of the container. Similarly, bead 20 is annularly shaped in the preferred embodiment and will thus scrape liquid off the side walls around the entire top portion of the container 2.

The container 2 can be made out of any suitable material. However, the invention is particularly adapted to provide an improved cover for a standard paperboard container which is lined on the inner surface with a metal foil such as aluminum or lined with polyethylene.

The cover 10 can be made out of any suitable rigid or semi-rigid moldable material such as polymers and copolymers of ethylene, propylene, and butene-1, polystyrene polyvinylchloride and the like. Low density polyethylene is preferred. In the case of a round container, the diameter of bead 16 will be less than the diameter of the outer portion of the outwardly flared rim 6. Further, the outer diameter of inner flange 18 will be less than the inner diameter of upstanding walls 8. The outer diameter of projection 20 will be at least as great as the inner diameter of upstanding walls 8. Preferably the outer diameter of projection 20 will be slightly greater than the inner diameter of upstanding walls 8 so that a good squeegee effect can be carried out in applying the cover to the container.

Referring now to FIGURE 2, where like numbers have been used to designate like parts, the inner flange 18' of the cover 10 slopes downwardly and outwardly, terminating in a point 20' (in cross section). The pointed annular flange 18' wipes food and/or liquid from the inner wall portion 22 of the container as the cover is applied to the container. Further, the shape of the flange 18' will push the food back away from the container as the cover is applied so that food particles will not lodge between the container wall 22 and the inner flange 18' and thereby force point 20' away from the container wall.

I claim:
1. An article of manufacture comprising a container having an upstanding side wall with an outwardly flared rim at the top portion thereof to form a flared open end of said container, and a cover comprising:
   (a) a closure portion which conforms to the shape of said container and is adapted to fit over said open end of said container,
   (b) an outer flange depending downwardly from said closure portion and extending around the periphery of said closure portion, said outer flange having an inwardly extending clamping bead adapted to be positioned under said outwardly flared rim of said container to clamp said cover to said container,
   (c) an inner flange depending downwardly from said closure portion inside of and spaced from said outer flange, said inner flange having an outwardly extending projection in the bottom portion thereof substantially below said inwardly extending clamping bead and adapted to contact the inside surface of said upstanding side wall around the entire top portion of said container below said outwardly flared rim to scrape material away from the upper portion of said inside surface of said upstanding wall below said outwardly flared rim, said outwardly extending projection contacting said upstanding side wall at an obtuse angle with respect to the portion of said upstanding side wall having material to be scraped, the outer dimensions of said outwardly extending projection being at least equal to the inner dimensions of said upstanding side wall below said outwardly flared rim but less than the maximum inner dimensions of said outwardly flared rim.

2. An article of manufacture in accordance with claim 1 wherein said container is circular in cross section and said cover is circular in cross section and the clamping bead of said cover has an inner diameter less than the outer diameter of said outwardly flared rim of said container, said outwardly extending projection is annularly shaped and has an outer diameter which is at least as great as the inner diameter of the upstanding side wall of said container.

3. An article of manufacture according to claim 2 wherein said upstanding side wall is constructed of paperboard lined with aluminum foil.

4. An article of manufacture in accordance with claim 2 wherein said outwardly extending projection narrows to a thin flange at the greatest diameter thereof.

5. An article of manufacture in accordance with claim 1 wherein said cover is made of polyethylene.

References Cited

UNITED STATES PATENTS

| | | | |
|---|---|---|---|
| 3,352,448 | 11/1967 | Livingstone | 220—60 |
| 2,555,380 | 6/1951 | Stuart et al. | 229—3.5 |
| 2,754,866 | 7/1956 | Coltman | 150—.5 |
| 3,038,624 | 6/1962 | Wieckmann | 215—41 |
| 3,049,277 | 8/1962 | Shappell. | |
| 3,302,812 | 2/1967 | Busch et al. | 215—40 |

FOREIGN PATENTS

| | | |
|---|---|---|
| 494,244 | 3/1950 | Belgium. |
| 930,866 | 7/1963 | Great Britain. |
| 174,552 | 3/1961 | Sweden. |

DONALD F. NORTON, Primary Examiner

U.S. Cl. X.R.

150—.5